US006924945B1

(12) United States Patent
Richardson

(10) Patent No.: US 6,924,945 B1
(45) Date of Patent: Aug. 2, 2005

(54) COMPACT LIGHT COLLECTION SYSTEM WITH IMPROVED EFFICIENCY AND REDUCED SIZE

(76) Inventor: Brian Edward Richardson, 18675-P Adams Ct., Morgan Hill, CA (US) 95037

( * ) Notice: Subject to any disclaimer, the term of this patent is extended or adjusted under 35 U.S.C. 154(b) by 0 days.

(21) Appl. No.: 10/696,662

(22) Filed: Oct. 28, 2003

(51) Int. Cl.[7] .......................... G02B 17/00; F21V 7/00; F21V 5/00

(52) U.S. Cl. ....................... 359/726; 362/297; 362/328

(58) Field of Search ................. 313/111, 114; 359/726; 362/268, 297, 328

(56) References Cited

U.S. PATENT DOCUMENTS 5,936,772 A * 8/1999 Suzuki ....................... 359/627

* cited by examiner

*Primary Examiner*—David N. Spector
(74) *Attorney, Agent, or Firm*—The Kline Law Firm

(57) ABSTRACT

A light collection system that includes a light source, a condenser lens, a reflector mechanism to collect and focus light from the light source, an aperture, and an image lens. A light beam from the light source is focused through the aperture to define the image to be projected. Ancillary reflector elements can be positioned to collect light not collected by the reflector means. The result is a compact collection system with a smaller image lens and excellent collection efficiency.

6 Claims, 9 Drawing Sheets

COMPACT LIGHT COLLECTION SYSTEM WITH IMPROVED EFFICIENCY AND REDUCED SIZE

BACKGROUND OF THE INVENTION

1. Field of the Invention

The present invention relates generally to entertainment and architectural lighting. Specifically, the invention is a device for use in a lighting fixture and or light projectors that collects light and redirects it to a specific point or direction. The invention can also be applied to other equipment that collects light, such as film and digital projectors.

2. Description of the Prior Art

Lighting fixtures are often used in theater, television, touring productions, and architectural applications. The lighting fixtures typically have a light source and a collection means to redirect the light to a specific point or direction. Often only a small portion of the light is redirected to the desired point or direction. Collection efficiency ranges from 20% to 60% of the light produced by the lamp. Light collection efficiency is an important issue in fixture design.

Larger lamps usually have a filament or arc that is of significant size. The large size of the light source and the lack of complete collection efficiency require that the means of collection be of significantly larger size than the lamp. A large reflector or other means of collection is required if the direction of light needs to be controlled accurately. The larger the ratio of the size of the means of collection to the size of the source, the greater the control of the accuracy of the output. This ratio is an important factor to consider when selecting the best means of collection. A smaller ratio generally allows for a more compact package, which typically leads to a lower cost. However, the smaller size ratio reduces the efficiency with which the light is collected.

A typical current art system for lighting used in the entertainment industry is illustrated in U.S. Pat. No. 5,268,613 by Cunningham, issued Dec. 7, 1993. This general method for collecting light produced by a lamp has been used by most of the major manufacturers of lighting equipment for many decades. A schematic representation of this type of collection system is shown in FIG. 1.

The system 1 for collecting light shown in FIG. 1 is capable of operating with reasonable efficiency even with a poor collection percentage. Light source 2 is shown to be of moderate size. The light rays 3 emanating from the light source propagate in all directions. Rays 4 are reflected by the reflector 5 toward the light path. A typical reflector of this type would collect approximately two-thirds of the light emanating from the source. Those light rays 6 that emanate opposite the reflector do not get collected and are wasted. The reflected rays 7 that are reflected from the reflector are directed towards the aperture 8. The light that emanates from the center of the source 2 is focused to, in the case of an elliptical reflector, a focus of the ellipse 9. FIG. 1 shows this focus point to be at the center of the aperture 8. Light that emanates from the extremities 10 of the source is reflected from the reflector at an angle significantly different than that of the center rays. This angle is related to the distance of the reflector to the source divided by the size of the source. A smaller angle generally results in improved efficiency and a more compact size of the aperture and image lens. Tracking these extremity rays in FIG. 1, one can see that the rays do not hit the focal point as the center rays do. They are reflected at a substantial angle from the center rays. This angle determines the size of the aperture. The aperture 8 may contain an object to be projected or just be a round hole. The light that passes through this aperture is refracted by the image lens 11. The image lens 11 images the object in the aperture 8 on a wall or scenic element in a typical application, such as in theatrical productions. This method of collecting light is typical of most lights used by theaters and television studios. This proportion of the source to reflector, aperture and image lens, as depicted in FIG. 1, is generally what is used today.

FIG. 2 shows the ray trace of a system 1' that has a smaller reflector to source length. The reflector 5' extends further forward than the reflector 5 shown in FIG. 1. The extended reflector collects more light. The problem with this design is that the size of the aperture 8' and image lens 11 need to be much larger.

FIG. 3 shows a reflector system 1" that has a reflector 5" that is larger than that shown in FIG. 1. The distance between the reflector 5" and the source 2 is also greater. This results in the collected light being more parallel. The big problem with this design is that the image lens also needs to be large. A large reflector not only makes the system larger, but a large lens creates a poorer image. A larger lens requires a more sophisticated design to create the same image quality as a smaller lens.

FIGS. 1, 2 and 3 illustrate the problems in designing a compact, low cost, and efficient collection and imagining system. An improvement of one of the parameters of the system generally results in the degradation of another.

FIG. 4 shows another type of collection system 1'" often used in video or digital projectors. It is also used to a lesser extent in lighting fixtures. FIG. 4 depicts the same source 2 as in FIGS. 1, 2, and 3. The rear light rays 4 contact a spherical reflector 14. This light is redirected to the source and onto a condenser lens 16. The forward light rays 18 also contact the condenser lens. Upper and lower rays 6 are lost. The loss of the upper and lower rays 6 is the main disadvantage of this type of system. The light that is directed onto the condenser lens 16 is refracted to the aperture 8. The size of the aperture 8 relates to the ratio of the distance between the source 2 and lens 11 and the distance between the lens 11 and the aperture 8. Generally this type of system results in rays that are more parallel, and requires a smaller aperture. This leads to the image lens 11 also being smaller. Overall the condenser system allows for a relatively compact system, a smaller image lens, and more parallel rays. The main drawback of this type of system is poor collection efficiency.

Accordingly, it is an object of the present invention to provide a light collection system that is compact.

It is another object of the present invention to provide a light collection system that requires a small, less expensive object lens.

It is still another object of the present invention to provide a light collection system that has improved collection efficiency.

SUMMARY OF THE INVENTION

The present invention is a light collection system comprising a light source, a spherical lens to redirect rear traveling light back toward the source, a lens, and a reflector to direct the redirected light and forward traveling light rays through an aperture and then onto an image lens.

A light beam from the light source is focused through the aperture to define the image to be projected. The smaller image lens reduces the cost of the system, and provides a better quality resultant image.

An advantage of the present invention is that by adding a reflector to a condenser lens and a spherical lens the collection efficiency is greatly increased to greater than a reflector or condenser system alone.

Another advantage of the present invention is that the aperture required is smaller than a medium efficiency reflector system.

A still further advantage of the present invention is that since the image lens can be smaller, it provides a better quality image of the object at a lesser cost.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
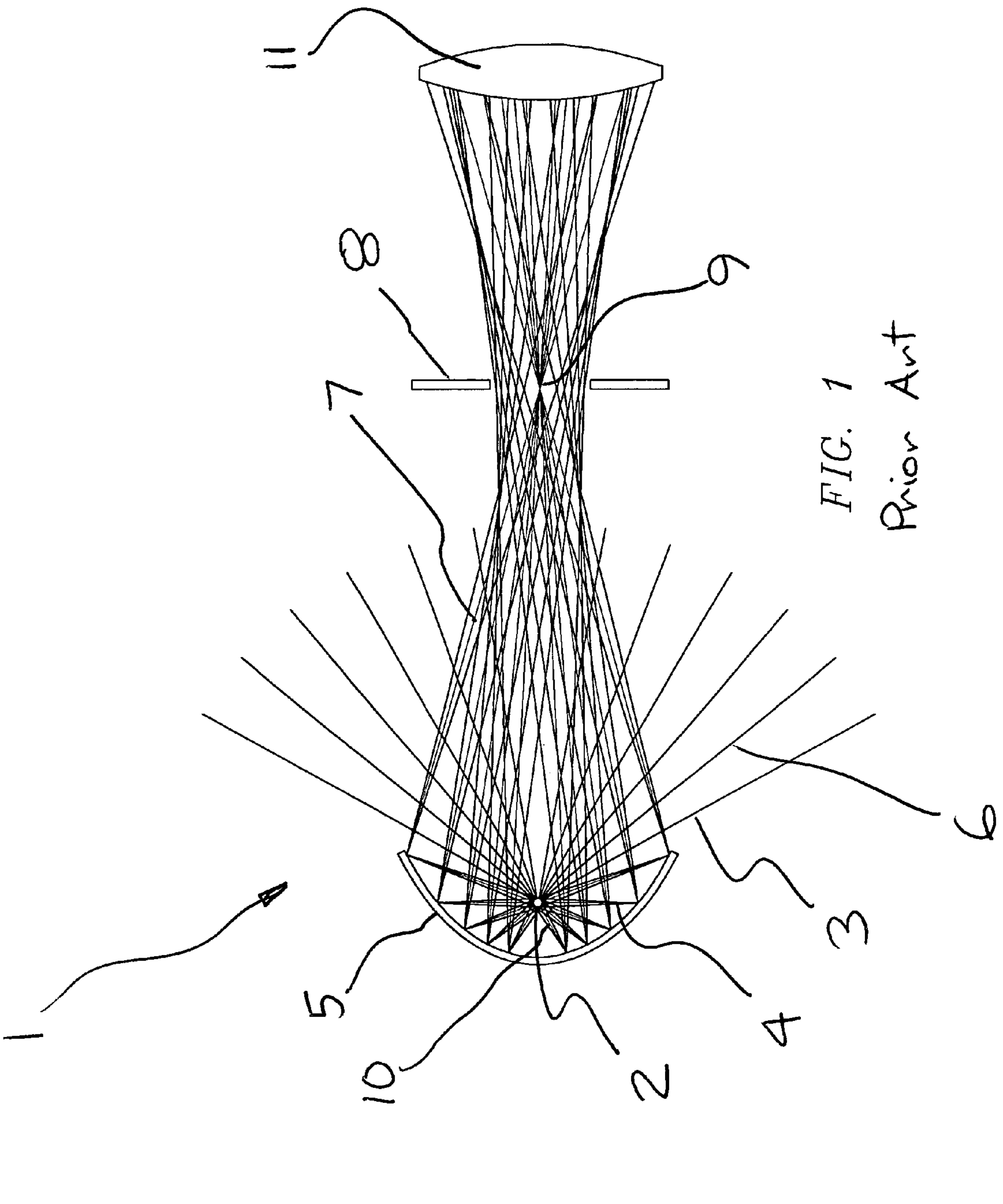
FIG. 1 Prior Art
FIG. 1 is a schematic view of a prior art light collection system using a reflector.
Figure 2:
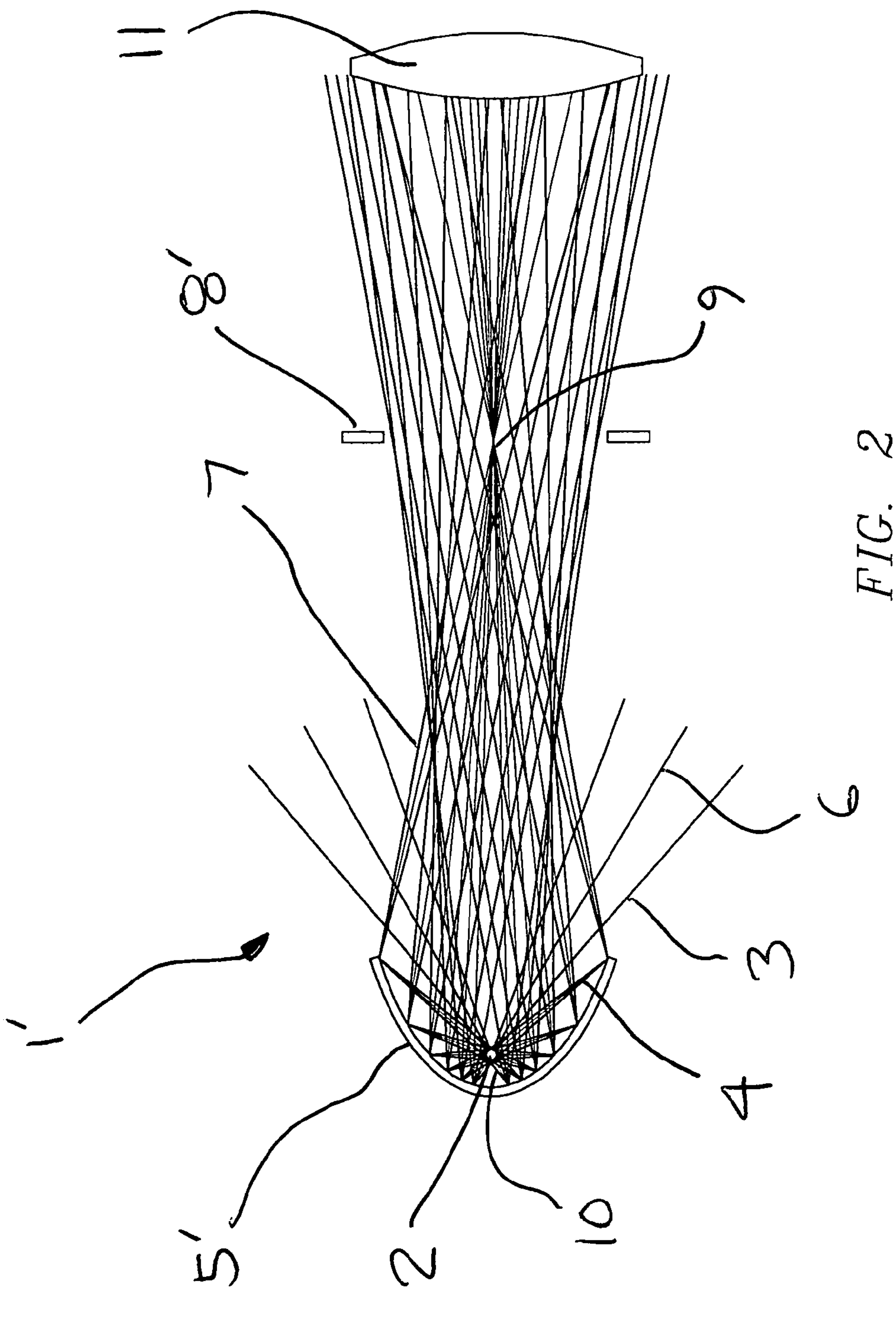
FIG. 2 Prior Art
FIG. 2 is a schematic view of a variation of the prior art system shown in FIG. 1.
Figure 3:
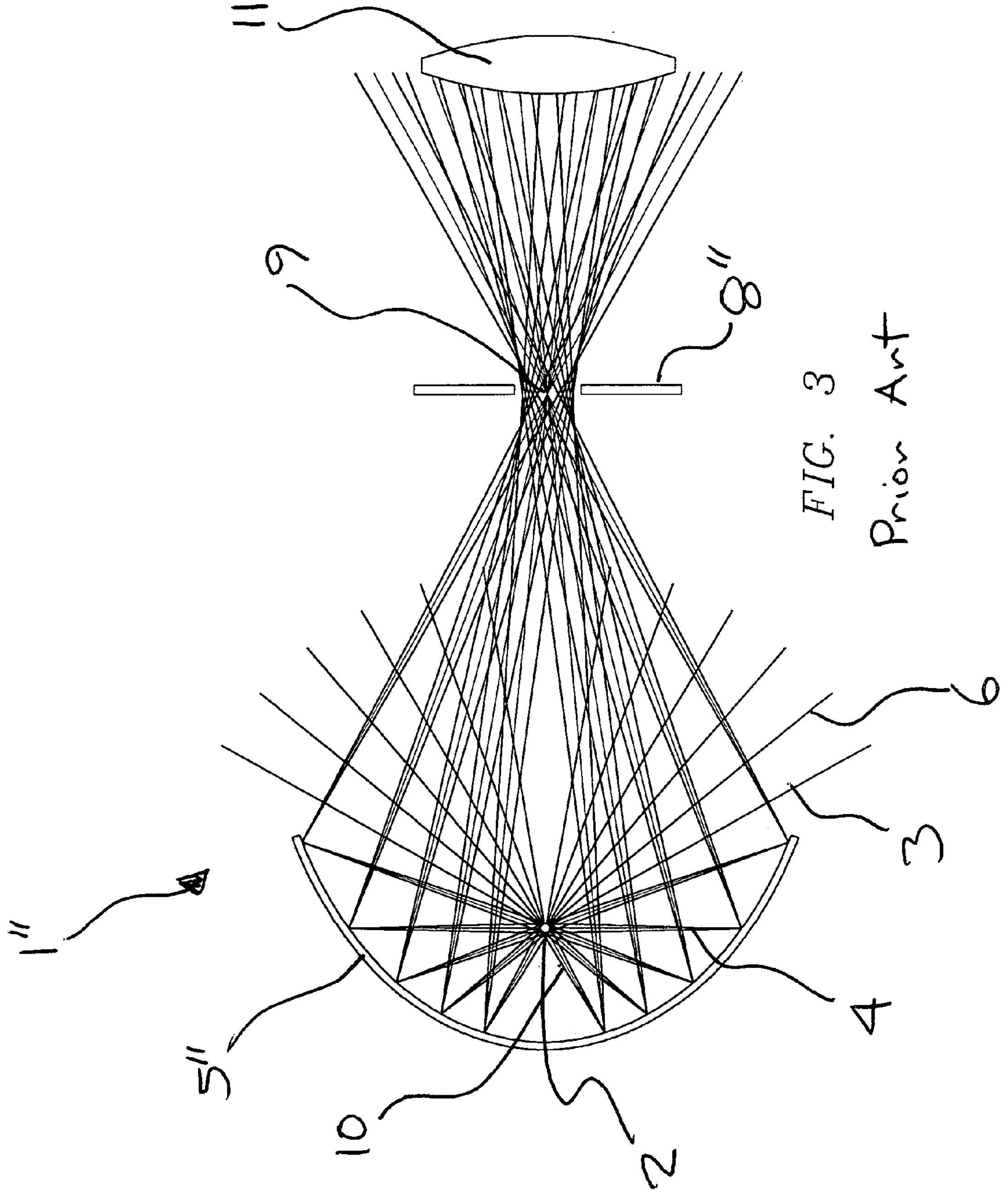
FIG. 3 Prior Art
FIG. 3 is a schematic view of another variation of the prior art system shown in FIG. 1.
Figure 4:
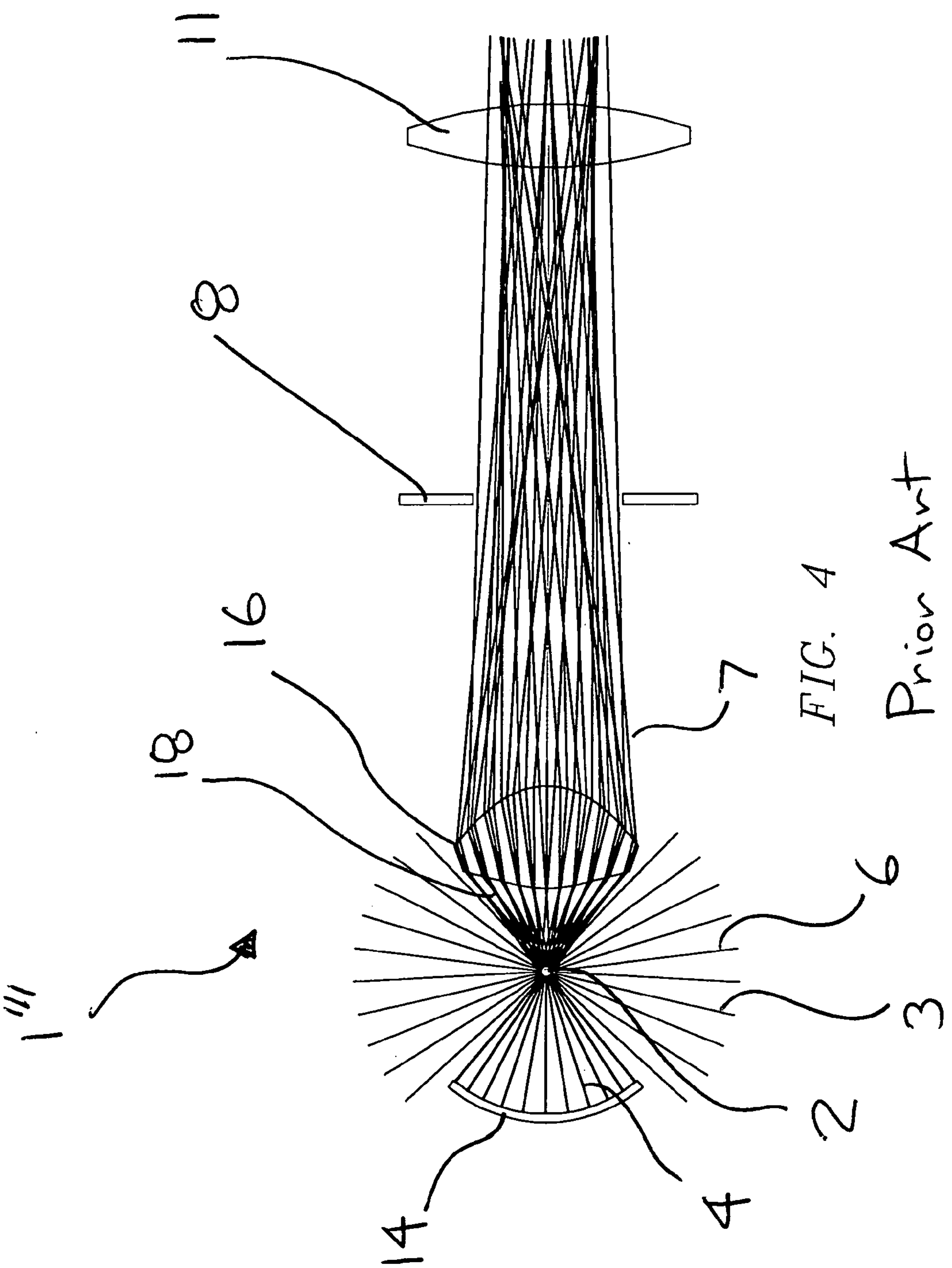
FIG. 4 Prior Art
FIG. 4 is a schematic view of an alternate prior art light collection system using a condenser lens.
Figure 5:
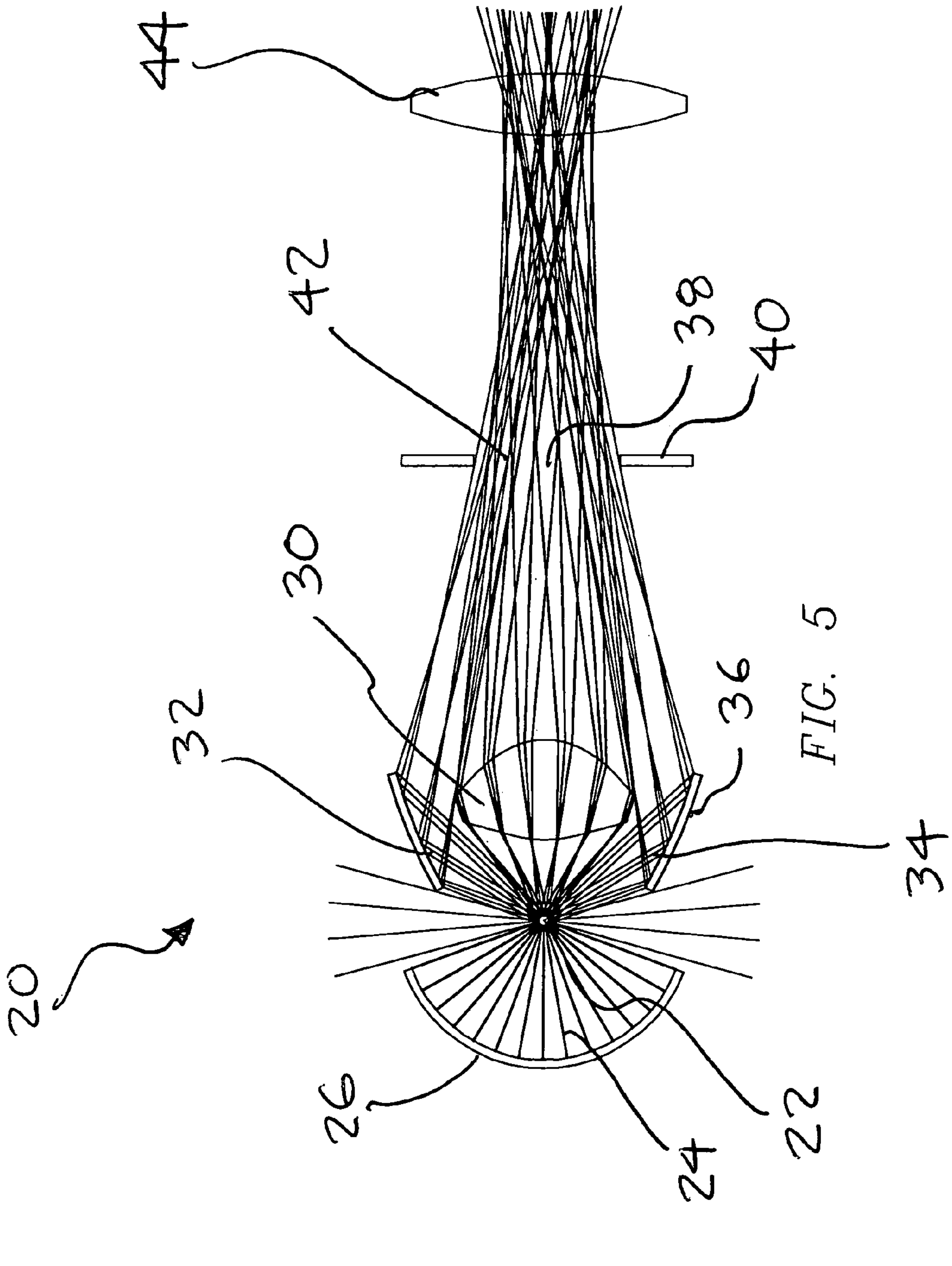
FIG. 5 is a schematic view of the light collection system of the present invention with both a condenser lens and a reflector for collecting light.

Referring first to FIG. 5, the present invention is a light collection system 20 that comprises a light source 22 that radiates light in all directions. The light source 22 can be an incandescent light, an arc lamp, or one or more LED's. The element shown only includes the light generation portion of the light source 22. The other related parts that accompany the lamp are not shown for clarity. The rearward light 24 emanating from the source is reflected back to the source by a spherical reflector 26. The spherical reflector 26 can be integral with the light source 22 or it can be a separate component. The spherical reflector 26 can also be internal or external to the glass envelope of the light source 22.

The size of the spherical reflector 26 does not significantly effect the collection efficiency as it does other types of reflectors. The size required for a particular system is determined by the size of the lamp envelope and whether it is internal or external to the envelope.

The redirected light rays from the spherical reflector 26 combine with central front light rays that were originally directed in the forward direction. The combined light that is primarily headed in the forward direction contacts a spherical condenser lens 30. The condenser lens 30 refracts the light to the area forward 38 where the aperture 40 is located. The light that is directed in upper 32 and lower 34 forward directions contacts a secondary reflector 36. The secondary reflector 36 also directs light to the forward area 38 where the aperture 40 is located. The diameter of the opening 42 of the aperture 40 is approximately the size of the light as it passes through the aperture. The aperture 40 defines the object of the lighting system 20. After the light rays pass through the aperture 40, the light reaches an image lens 44. The image lens 44 focuses the light rays into the image projected by the system 20. This image may be, for example, projected onto a stage or scenic element, as in the case of a theatrical production.

Figure 6:
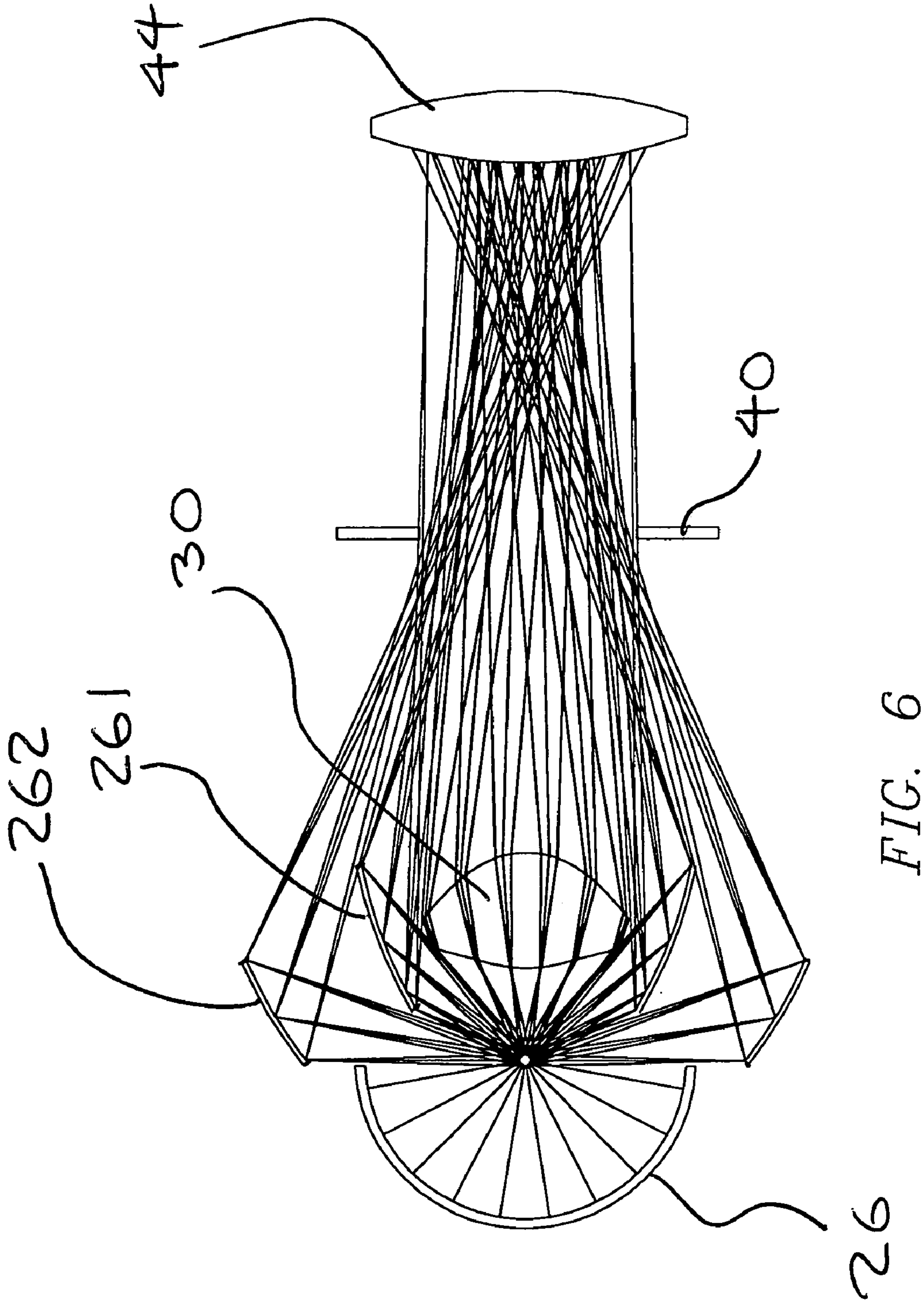
FIG. 6 is a schematic view of the light collection system with an additional reflector section.

FIG. 6 illustrates an alternate method of constructing the reflector mechanism of the present invention. As illustrated in FIG. 6, the system 20 can comprise a spherical reflector 26 that works in conjunction with a first ancillary reflector 261 as well as a second ancillary reflector 262. The addition of the second ancillary reflector 262 provides for collection of a greater percentage of the generated light while keeping the overall size of the system 20 to a minimum.

Figure 7:
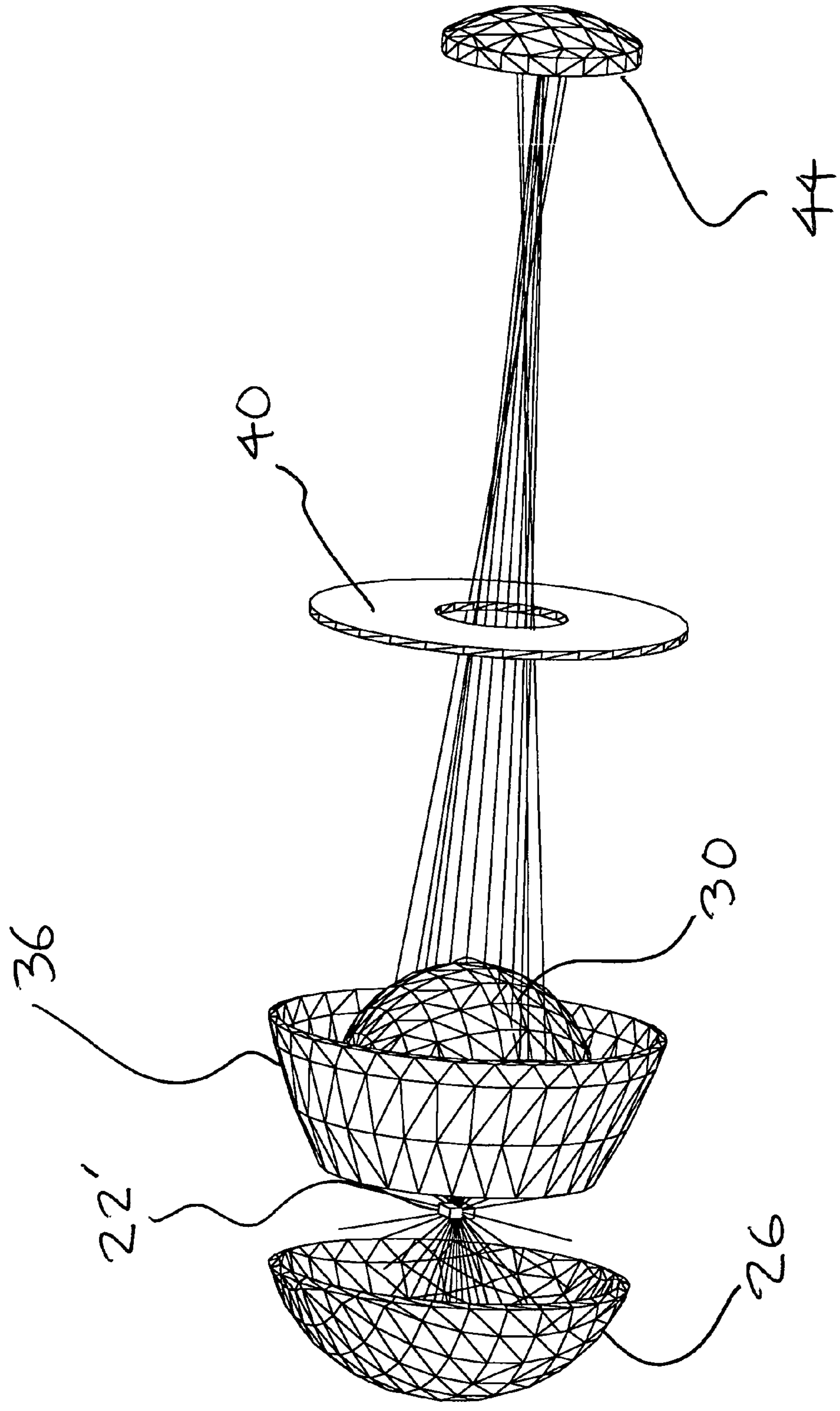
FIG. 7 is a perspective view the light collection system shown in FIG. 5 with a planer type filament.
Figure 8:
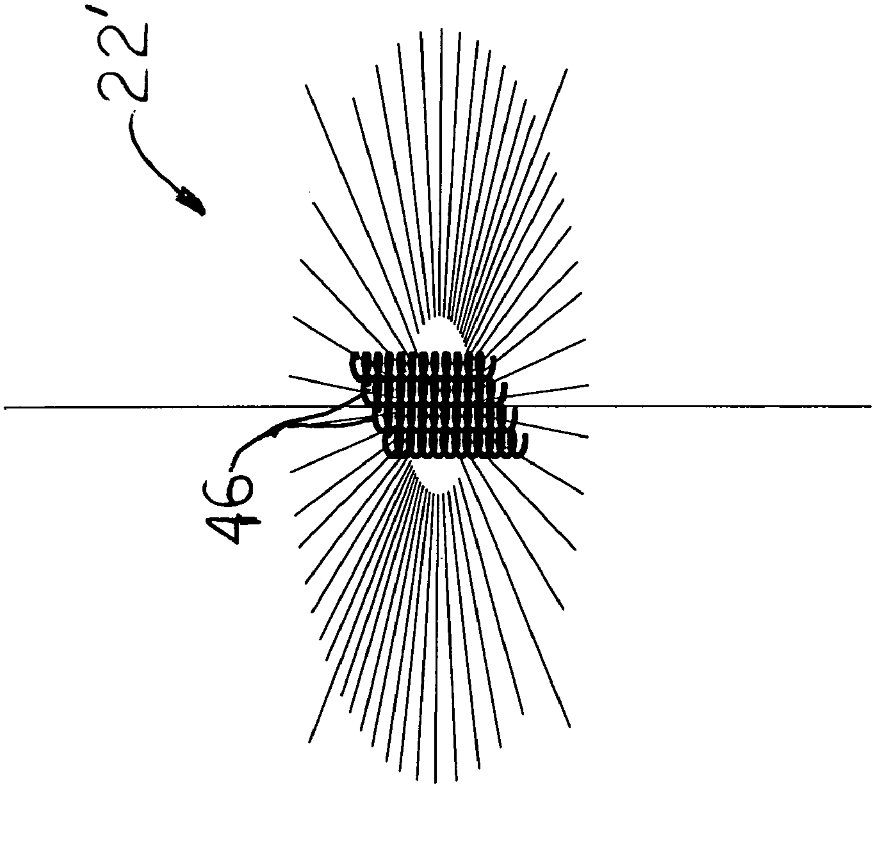
FIG. 8 is a detail perspective view of the planer filament shown in FIG. 7.
Figure 9:
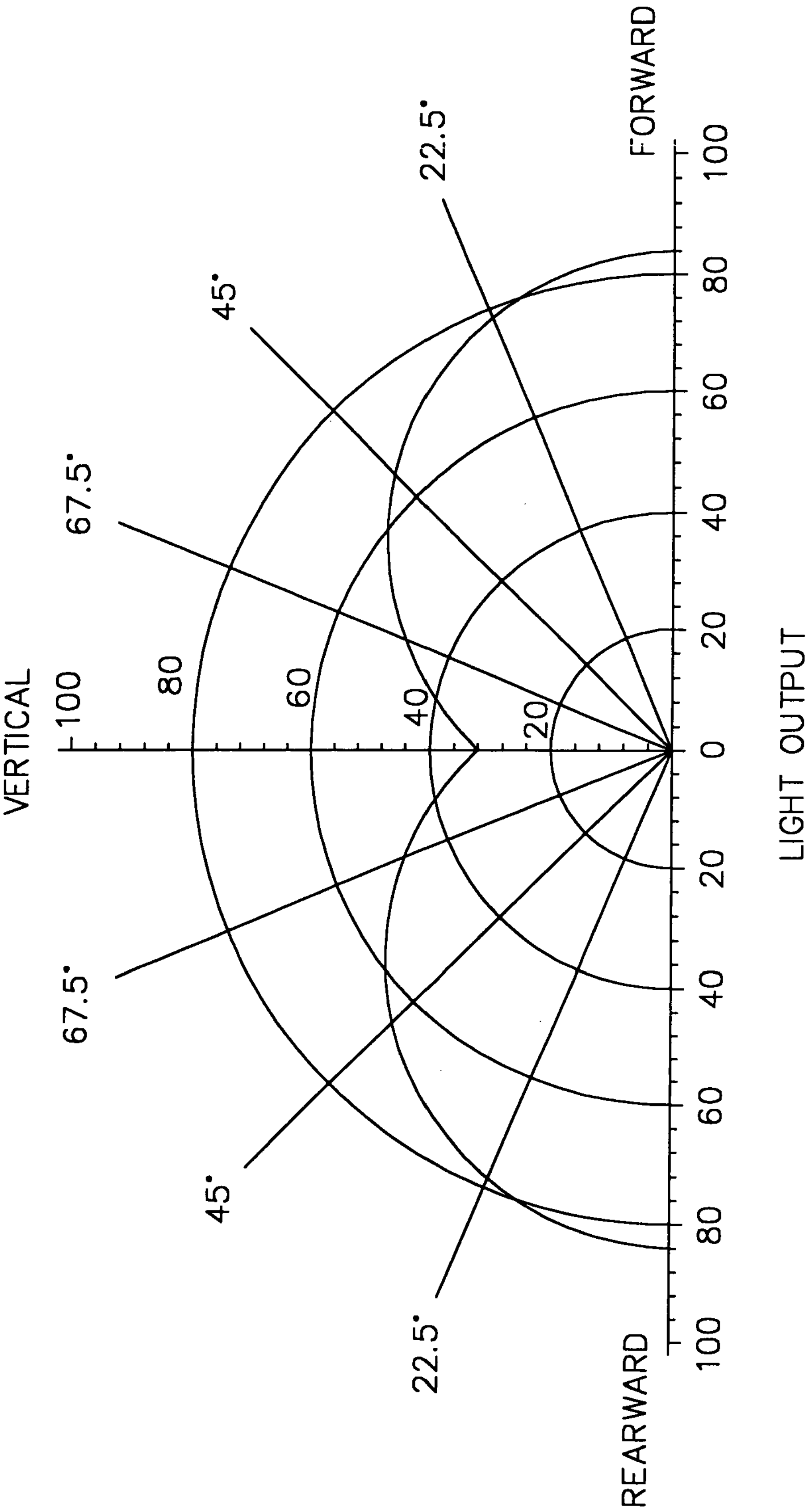
FIG. 9 is a polar graph of the light output of a light source with a planer filament.

FIG. 7 shows a refinement to the system 20 shown in FIG. 5. This embodiment shows a refined light source 22'. The light source 22' is a planar source that is larger in the vertical and horizontal axes, but is narrower in the axial direction as compared to the light source shown in FIGS. 5 and 6. A more detailed view of this type of planar filament is shown in FIG. 8. In the detailed view of FIG. 8, the coiled filaments 46 are arranged in side by side fashion so as to form a generally rectangular planar element. The light source 22' is shown to have four sets of coiled filaments 46. The actual number of coiled filaments 46 that is utilized is not significant. The only significant factor is that it is desirable to form an element that has a face that is generally equal in width and height. The face of the light source 22' does not need to be square, and the height of the individual coils 46 does not need to be uniform. The shape of the face of the source 22' could be circular. A planar light source 22' generates more light in the axial direction than in the vertical and horizontal directions. A polar graph of the light output of light source 22', or any other planar light source of this type, as a function of emanation angle is shown in FIG. 8. This type of source improves the overall efficiency of the system shown in FIG. 5. The improved efficiency is due to the fact that the light that is wasted (not collected by the reflector mechanism) is of much lower intensity than the light that is collected.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A light collection system comprising:

a light source, a condenser lens in front of said light source along an optical axis, said condenser lens redirecting light from said light source, a reflector mechanism to redirect light generated by said light source, an aperture in front of said condenser lens along the optical axis, said aperture defining an object of said system, and an image lens in front of said aperture along the optical axis, said image lens defining an image projected by said system; wherein said reflector mechanism comprises a primary reflector and at least one ancillary reflector element, said primary reflector being behind said light source along the optical axis, and said at least one ancillary reflector element being coincident with or in front of said light source along said optical axis.

2. The light collection system of claim 1 wherein:

said system further comprises a spherical lens that directs light toward said aperture.

3. The light collection system of claim 1 wherein:

said light source comprises a planer filament.

4. The light collection system of claim 1 wherein:

a height of a face of said planar filament is approximately equal to a width of a face of said planar filament.

5. The light collection system of claim 2 wherein:

said light source comprises a planer filament.

6. The light collection system of claim 2 wherein:

a height of a face of said planar filament is approximately equal to a width of a face of said planar filament.

* * * * *